UNITED STATES PATENT OFFICE 2,317,362

PROCESS OF TREATING OILS

Ivor M. Colbeth, East Orange, N. J., assignor to The Baker Castor Oil Company, New York, N. Y., a corporation of New Jersey No Drawing. Application July 17, 1940, Serial No. 346,023

7 Claims. (Cl. 260—398)

This invention relates to the process of treating hydroxyl containing oils in such a manner that unsaturation of the oil is produced or increased. In carrying out this invention boryl pyrosulphate is reacted with compounds containing hydroxylated fatty acid radicals. The invention also relates to the products obtained.

In my prior application Serial No. 311,121 filed December 27, 1939, now Patent No. 2,278,425, I have described a process of producing a drying oil, but the present invention differs from that described in said application in a number of ways. It also differs from my prior Patent No. 2,125,544 in which the preparation of tough resilient products obtained by treating vegetable oils containing hydroxyl groups with derivatives of boron is described.

I have found with the prior process that the greater the amount of reagent used, the darker is the color of the resulting products; the lower the temperature of reaction, the lighter is the color of the resulting products; and the shorter the time of the reaction, the lighter is the color of the resulting products.

In accordance with the present invention I have discovered that when a boron compound such as borax or boric acid or anhydride or boron oxide is mixed with sulfuric acid and heated to a temperature where dense white fumes of $SO_3$ are evolved, a compound of boric acid and sulfuric acid which has the formula corresponding to $BOHS_2O_7$ or boryl pyrosulphate is formed, when boric acid or boric anhydride is used; and a compound corresponding to the formula $BONaS_2O_7$ or sodium boryl pyrosulphate is formed when borax is used. These compounds react with organic hydroxy compounds at elevated temperatures so that simultaneous dehydroxylation and dehydrogenation occur with splitting off of water with such avidity that great care has to be used in handling them so as to keep the reactions under control.

The boryl pyrosulphate may be ground and added to the oil as a powder, but better results are obtained if the oil is heated to about 260° C. and a mixture of borax or boric acid or boric anhydride and sulphuric acid in the proper proportions to form the boryl pyrosulphate is introduced into the oil. The reaction which takes place yields a dehydrated product which differs from ordinary dehydrated oils since the boron appears to remain as an integral part of the product or in chemical combination therewith, whereas, in other dehydration reactions where an alkali and an acid are used, the reagent becomes insoluble in the oil and may be filtered from it as a fine precipitate. In the present process, however, the treated oil is clear and brilliant and contains no filterable suspended matter.

The time of reaction is decreased from approximately four or five hours at 260° C. to less than one-half hour even when the oil is treated with only about 0.10 to 0.25 percent of the boric and sulphuric acid compound or boryl pyrosulphate as compared to the time required when the boric acid is used alone. The reaction begins at a temperature of about 190° C. and is complete in about twenty or thirty minutes when 0.10 to 0.25 percent of boryl pyrosulphate has been added to the oil and the temperature has reached 260° C. It has been found, moreover, that the extent of conversion of the oil, such as ricinoleic glyceride, for example, to an unsaturated compound is very much more complete than is the case with other catalysts. When a refractive index of 1.4820 has been reached, the acetyl value of the oil will have been reduced from 150 to below 10 with a viscosity of about 1.5 poises, and when a refractive index of 1.4835 has been reached, the acetyl value is from 0 to 3 while the viscosity is only about 2 poises.

The presence of the boron pyrosulphate in the oil renders subsequent bodying of the oil very much easier and permits bleaching of the oil while it is being bodied. This is accomplished by raising the temperature of the oil to about 300° C., whereupon noticeable bleaching takes place. The temperature is then lowered to about 250° C. and the bodying is continued to the desired consistency. In this way a drying oil is produced which has a high refractive index and will dry in about eight hours without further addition of catalyst, or will set into a gel when heated about 30 minutes at 300° C. with substantially no change in color.

Since this reaction is conducted at such a low temperature, very little hydrolysis of the oil takes place, and the acid value of the finished oil is slightly higher than the original oil. For example, starting with an oil with an acid value of 1.5, a drying oil with an acid value of 1.8 was obtained which was clear and brilliant and required no further treatment to make it suitable for commercial use.

I have also found that by preparing boron derivatives of oil as described, for example, in my patent and applications mentioned above, by adding any compound of boron which will react with the hydroxyl group, such as metallic borates, boric acid, boric anhydride, halides of boron, sulphates, acetates, and other organic compounds of boron, and then adding to the resulting product from 0.10 to 0.25 percent of sulphuric acid, products are formed similar to those described above. The sulphuric acid causes the boron derivatives of oil to be decomposed with the elimination of water, and drying oils of lower viscosity, higher refractive index, lighter color, and lower acid value than is possible without the use of the boryl pyrosulphate, are produced. Unsaturated hydroxyl containing oil such as castor oil or grape seed oil may first be oxidized and then treated with the compounds mentioned above at a temperature of about 260° C., or in the case of oils which do not contain hydroxyl groups they may be oxidized at low temperatures so as to form hydroxyl groups and then treated with the boryl pyrosulphate and heated to effect the decomposition of the boron compound and formation of drying products.

When the amount of borax is increased to twice the theoretical amount required for the preparation of the sodium boryl pyrosulphate, the resulting products appear to be as advantageous as the sodium boryl pyrosulphate and they have the additional advantage of keeping the acid value of the final oil at a minimum.

The following are given as specific examples of carrying out the process, and are intended to illustrate the process without restricting it.

Example I 1000 parts by weight of castor oil are treated with from 10 to 15 parts of boric anhydride until foaming has subsided or practically ceased, which is an indication that the esterification of the castor oil and boric acid has been completed. At the end of this period 0.10 to 0.25 percent of sodium boryl pyrosulphate based on the castor oil is introduced into the oil. The temperature should be maintained at about 200° C. Upon the introduction of the sodium boryl pyrosulphate vigorous foaming takes place and the viscosity of the mixture rapidly decreases, indicating that the viscous high molecular weight product first formed is being decomposed. The heating is continued until the desired degree of drying has been reached, which can be recognized by the iodine value having been increased to 140 or more and the refractive index to 1.4800 or more.

Example II 1000 parts by weight of castor oil are treated with from 1.0 to 1.5 parts of dry borax until a product having about the consistency of Vaseline is formed. 10 parts of sulphuric acid dissolved in water to form a 2 percent solution are then introduced into this mixture. A vacuum is maintained at about 15 millimeters pressure and the temperature is maintained at about 190° C. The gelatinous product first formed is quickly decomposed with vigorous evolution of bubbles which is caused by the escaping steam, and a thin transparent liquid having drying properties results in about one-half to one hour.

Example III

Castor oil is first oxidized or treated with ozone so as to increase the acetyl value to about 180–190. The acetyl value of castor oil treated at about 80–90° C. in this manner while ozone air or oxygen is bubbled therethrough will increase up to about 200. Such oil, when treated either as in Example I or Example II, is converted into a drying oil of slightly darker color than the original oil.

Example IV

Castor oil is heated to between 260° and 300° C. until 5 to 10 percent of its weight is lost due to the formation of undecylenic acid and heptaldehyde which distill off. The temperature is then reduced to 240° C., and 0.1 to 0.2 of 1 percent of boryl pyrosulphate or sodium boryl pyrosulphate, dissolved in water to form a 5 percent solution, is slowly added. The reaction is continued until the acetyl value has been reduced to below 10, and the refractive index to about 1.4820, whereupon a pale colored drying oil is formed.

What is claimed is:

1. The process which comprises reacting glycerides containing hydroxylated fatty acid radicals with a small quantity of boryl pyrosulphate in order to produce unsaturated linkages.

2. The process which comprises reacting glycerides containing hydroxylated fatty acid radicals with a small quantity of boryl pyrosulphate at an elevated temperature in order to produce unsaturated linkages.

3. The process which comprises reacting glycerides containing hydroxylated fatty acid radicals with a small quantity of sulphuric acid and a boron compound in proportions to form boryl pyrosulphate in order to produce unsaturated linkages.

4. The process which comprises reacting castor oil with a small quantity of boryl pyrosulphate in order to produce unsaturated linkages.

5. The process which comprises reacting castor oil with a small quantity of sulphuric acid and a boron compound in proportions to produce boryl pyrosulphate in order to produce unsaturated linkages.

6. The process which comprises reacting castor oil with a small quantity of sodium boryl pyrosulphate in order to produce unsaturated linkages.

7. The process which comprises reacting castor oil with borax and treating the resulting product with such a quantity of sulphuric acid as to form boryl pyrosulphate in order to produce unsaturated linkages.

IVOR M. COLBETH.